Figure 1:
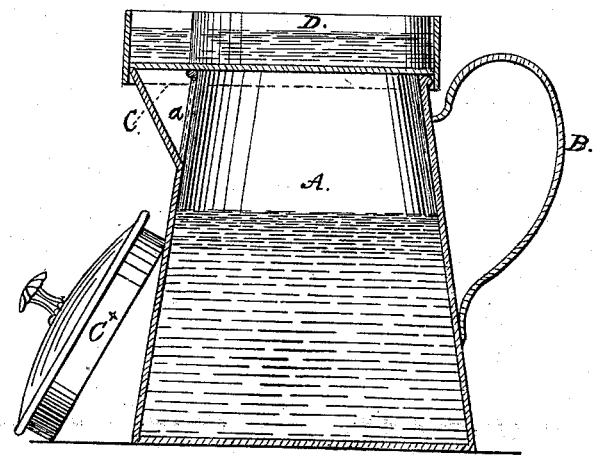

B. BORDMAN.
Coffee Pot.

No. 79,943.

Patented July 14, 1868.

Witnesses.

Inventor.

United States Patent Office.

BENJAMIN BORDMAN, OF MALDEN, MASSACHUSETTS.

Letters Patent No. 79,943, dated July 14, 1868.

IMPROVEMENT IN COFFEE-POTS.

*The Schedule referred to in these Letters Patent and making part of the same.*

TO ALL WHOM IT MAY CONCERN:

Be it known that I, BENJAMIN BORDMAN, of Malden, county of Middlesex, and State of Massachusetts, have invented a new and useful Improvement in Coffee-Pots; and I do hereby declare that the following is a full, clear, and exact description thereof, which will enable others skilled in the art to make and use the same, reference being had to the accompanying drawing, forming a part of this specification.

This invention relates to a new and useful improvement in coffee-pots, as hereinafter fully shown and described, whereby the steam and aroma which rise from the coffee during the process of boiling are condensed and saved, or not allowed to escape.

The means whereby this result is attained is extremely simple, and may be applied to a coffee-pot of the most simple construction. It consists of a condensing-chamber, constructed of tin or other suitable material, and of such a size and shape that it may be fitted steam-tight on the top of the coffee-pot, so as to cover both the top of the pot and the nozzle or spout thereof, said chamber, when the coffee reaches or nearly reaches the boiling-point, being filled with cold water or other suitable liquid, so as to condense the vapor or steam rising from the coffee, and thereby effectually prevent its escape.

The accompanying drawing represents a side sectional view of my invention.

A is the body or main portion of the coffee-pot, B the handle, and C the nozzle or spout thereof, the opening between which and the body A of the pot is covered with wire cloth, $a$, or, in lieu of this, a perforated partition may be used.

The pot thus constructed is similar to if not identical with the ordinary cheap coffee-pots in use.

The coffee-pot is provided with an ordinary lid or cover, $C^\times$, which is fitted on the pot when my invention is not applied or is not in use.

The coffee is ground in the usual way, and placed in the pot with the requisite quantity of water, and the pot placed on a stove or over a suitable fire to boil, and just previous to the contents of the pot reaching the boiling-point, a cup, D, is fitted on the top of the pot, said cup covering the top of the body, A, of the pot, and also the spout or nozzle C, as shown clearly in the drawing. This cup has a quantity of cold water or other liquid or substance placed into it, of a sufficiently low temperature to condense the vapor and aroma rising from the boiling contents of the pot, and the condensed vapor and aroma pass back or down within the pot.

After the strength of the coffee is obtained or extracted, the pot is removed from the fire and the contents allowed to cool, when the cup D is removed, and the lid or cover $C^\times$ placed on it. The coffee may then be poured from the pot as it is used.

The great advantage of this invention is its simplicity, cheapness, and the capability of its application to any ordinary coffee-pot. It answers the same purpose as the pretentious and expensive devices hitherto employed to effect the same end.

Having thus described my invention, what I claim as new, and desire to secure by Letters Patent, is—

The cup or condensing-chamber D, constructed and applied to an ordinary coffee-pot, A, in the manner substantially as and for the purpose herein set forth.

BENJA. BORDMAN.

Witnesses:
FRANK BLOCKLEY,
ALEX. F. ROBERTS.